Figure 1:
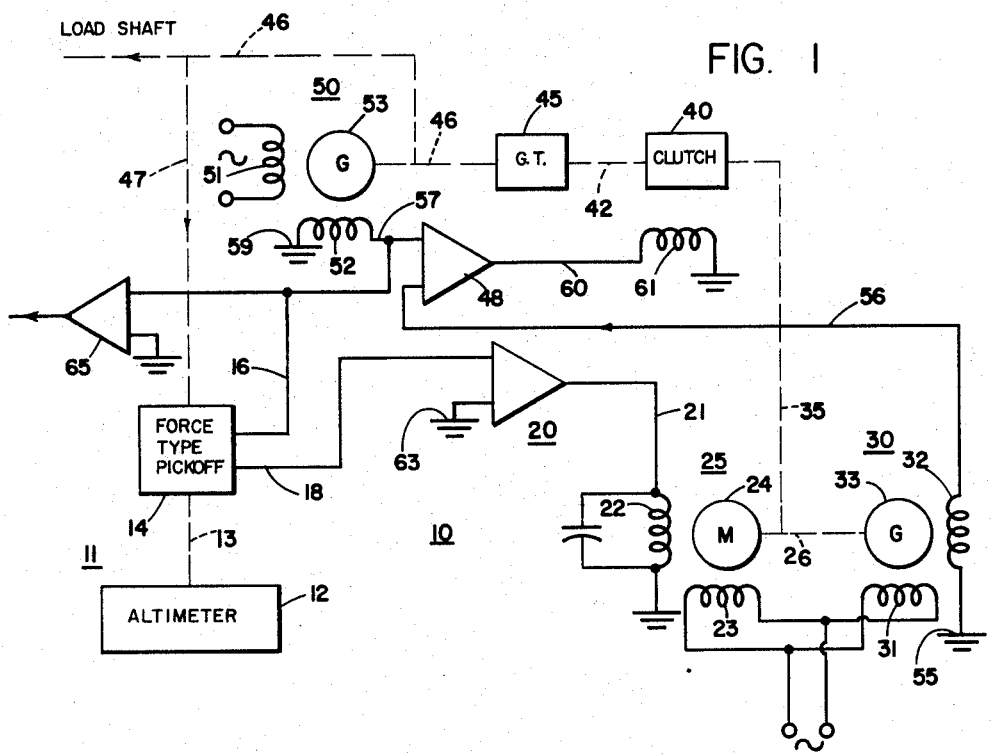

Sept. 22, 1964     R. W. ARMSTRONG ETAL     3,150,304

FOLLOW-UP CONTROL APPARATUS FOR MOTOR

Filed Jan. 22, 1962

INVENTORS.
ROBERT W. ARMSTRONG
DONALD W. RICKE
BY
ATTORNEY.

United States Patent Office 3,150,304
Patented Sept. 22, 1964

3,150,304
FOLLOW-UP CONTROL APPARATUS
FOR MOTOR
Robert W. Armstrong, Mound, and Donald W. Ricke, East Bethel, Minn., assignors to Minneapolis-Honeywell Regulator Company, Minneapolis, Minn., a corporation of Minnesota
Filed Jan. 22, 1962, Ser. No. 167,512
9 Claims. (Cl. 318—28)

This invention relates to control apparatus and more specifically to electric motor control apparatus or electric motor servo systems applicable to condition control apparatus. The invention is concerned with providing an improved follow-up or proportional servomotor system having a high dynamic range, rate output servo drive.

In prior servo systems wherein a controlled device followed a control device, the motor drive unit was frequently directly coupled to its load device and had an operation rate in accordance with the magnitude of a control signal. In many instances for small control signals, the frictional resistance of the servomotor and its load device was of such magnitude that an operation rate of the load device for such small signal was not obtained. In other words, there was a large control signal dead spot about the zero rate of change of position point of the motor which had to be exceeded before motor displacement rate occurred. The control signal thus had to reach a threshold value of considerable magnitude before a displacement rate of the load device occurred, and this resulted in a delay in operation of the load device to or in response to changes in magnitude of the control signal.

It is an object of this invention to provide an improved servo system wherein the load device is displaced at a rate even for small signals thereby decreasing the threshold value of the control signal to effect displacement of the load device.

Another object of the invention is to provide a servo system that couples the servomotor to a load device after the motor speed has attained an operation rate whereby initial operation of the motor is effected while the motor is "unloaded."

A further object of the invention is to operatively connect a servomotor to its load device in response to the operation rate of the motor.

Another object of this invention is to provide an improved follow-up servo system having damping means to provide stability at the null point of the system.

A further object of the invention is to transmit torque from the servomotor to its load device in response to operation rate of the motor and to modulate this torque transmission in accordance with the operation rate of the load device.

Figure 2:
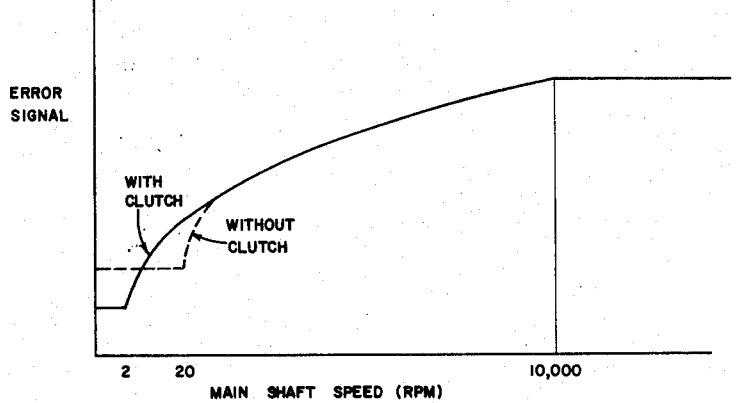

The above and further objects of the invention will appear upon consideration of an embodiment of the invention as described in detail below and illustrated in the drawing in which:

FIGURE 1 is a circuit diagram showing a servo system embodying the invention,
FIGURE 2 is a graph illustrating an advantage of the invention.

Briefly, this invention is concerned with a servo system of the null balance type having a condition sensing displacement error signal providing means, motor means controlled by the error signal, a motor rate voltage generator driven by said motor means and effective to connect the motor means through a rate generator responsive clutch device to a load device so that the magnitude of the torque transmitted to the load device varies in accordance with the motor rate, a tachometer driven by the load device or with the load device supplying a signal in opposition to that provided by the rate generator, and a displacement feedback signal produced by operation of the load device opposing the displacement error signal. In such system there is the combination that couples the motor to the load device in accordance with the operation rate of the motor and wherein the coupling is further modified by the operation rate of the load device to provide a high dynamic range, rate output drive and large range rate signal.

Referring to FIGURE 1 of the drawing, a follow-up type servo system 10 comprises a condition responsive electrical signal source 11, a servomotor amplifier 20 receiving said signals and controlling in turn operation of a servomotor 25 which operates a first rate signal voltage generator 30 and through operated magnetic clutch 40 and gear train 45 operates a second rate signal voltage generator 50. The two rate signal voltage generators 30, 50 in turn control an amplifier 48 that operates a control winding 61 of clutch 40 to couple the gear train 45 to motor 25, the output side of the gear train 45 in turn operating through the gear train output drive 46 to position a load device and through a sub-operating means 47 extending from drive 46 in feedback relation to signal means 11 to balance or null the signal means 11.

The signal source 11 is of the well known displacement error responsive rebalance type and for illustration is represented as a variable reluctance force type A.C. voltage signal generator similar to that disclosed in Kutzler Patent 2,820,188, see altitude pickoff 92 of the force rebalance type which is effected by motor 93, comprising a signal generator 14 operated by altimeter 12 through operating means 13. The arrangement is such that changes in altitude sensed by altimeter 12 alter the null or no signal condition of signal generator 14. This control signal from voltage signal generator or pickoff 14 is supplied through conductors 16, 18 to motor amplifier 20 operating motor 25.

Essentially, the above system permits motor 25 to start under no load relative to the output tachometer 50. As the motor speed increases in response to an error signal, the velocity signal generator 30 driven by the motor supplies a voltage to energize the clutch 40 gradually and smoothly accelerating the load shaft 46 of the servomotor 25 and driving signal generator 14 to null condition. At full motor speed no slip in clutch 40 is necessary.

Concerning the components of the system 10, an altitude error signal representative of a change in altitude from a datum is developed by an altitude signal generator 11 comprising an altimeter 12 which through operating means 13 displaces a variable reluctance type pickoff 14 to provide the altitude error signal. The altimeter 12 may be of the bellows type such as disclosed in Kutzler Patent 2,820,188 by bellows 80 and the variable reluctance force pickoff 14 may be similar to the force pickoff in said Kutzler patent shown at 92 therein. The altitude error signal is supplied over conductors 16, 18 to amplifier 20. The amplifier 20 may be of the conventional A.C. discriminator type. The output of the amplifier 20 is supplied by conductor 21 to an amplifier winding 22 of a capacitor type induction motor 25 having a second winding 23 energized from an A.C. supply having a frequency corresponding to that supplied to amplifier 20, as shown in detail in the aforesaid Kutzler patent, as controlling motor 93 therein. The motor 25 includes a rotor 24 and the direction of rotation of the motor 24 depends on the phase relationship between the current in winding 22 relative to that in winding 23. For one phase of A.C. signal on amplifier 20 the rotor 24 rotates in one direction, and for an opposite phase signal voltage on amplifier 20 rotor 24 operates in the opposite direction. Through its output shaft 26 motor 25 drives a velocity signal generator 30 having a line winding 31 energized from the A.C. supply and a second winding 32 inductively coupled to energized winding 31 through rotor 33 whereby the magnitude of the voltage in winding 32 is proportional to the speed of rotation of rotor 33. Through an output shaft 35 motor 25 has its operation applied to a clutch 40.

Preferably, clutch 40 is of the type known in the art and referred to as a magnetic particle clutch or a powdered metal clutch. In such clutch, the magnitude of the torque transmitted from motor 25 depends upon the electrical energization of the clutch. The output side of the clutch 40 is connected through an operating shaft 42 and gear train 45 to the main output shaft or load shaft 46.

Operatively driven from the main output shaft 46 is a tachometer or velocity signal generator 50 similar to the velocity signal generator 30 previously described. Velocity signal generator 50 comprises a line winding 51 energized from the A.C. supply, and an output winding 52 inductively coupled to winding 51 through rotor 53 so that the magnitude of the voltage induced in winding 52 is in accordance with the speed of rotor 53.

A clutch operating amplifier control circuit is supplied by algebraically series summing voltages with the circuit extending from ground 55, winding 32, conductor 56, to amplifier 48 and return through ground 59, winding 52 to amplifier 48. The output of amplifier 48 is supplied over conductor 60 to an operating winding 61 for clutch 40.

A further control circuit for servomotor amplifier 20 extends from ground 59, velocity signal generator winding 52, conductor 16, electrical pickoff 14, conductor 18, to amplifier 20 and return by amplifier ground 63. If desired the voltage in winding 52 may be included in this circuit. The operation or displacement of the main output shaft 46 is transmitted by a connecting shaft 47 to the force type pickoff 14 to rebalance or null the control circuit of amplifier 20.

The rate signal in winding 52 may be used directly in an altitude control system for an aircraft or may be applied to amplifier 65 for amplification before use.

In operation, an altitude error signal appearing on electrical signal voltage pickoff 14 is applied to servoamplifier 20 which operates motor 25. The motor 25 drives its velocity signal generator 30 to develop a motor rate signal in winding 32. At this point in the operation, the motor 25 may be said to be "unloaded" that is not coupled to its load.

The voltage in winding 32 is applied to the control circuit of amplifier 48 that energizes clutch winding 61 thereby if winding be sufficiently energized permitting torque to be transmitted from motor 25 to the main drive shaft 46.

It will be evident at this point that with motor 25 lightly coupled to its load shaft 46 even a small error signal from generator 14 on amplifier 20 will result in the operation of motor 25 and velocity signal generator 30. The voltage from winding 32 of motor rate signal generator 30 through amplifier 48 permits transmission of torque through clutch 40 which for low rate signals has slippage to smoothly accelerate the main output shaft 46. As the altitude error signal supplied to amplifier 20 increases, the speed of motor 25 increases and the voltage in winding 32 of signal generator 30 also increases permitting greater torque to be transmitted from motor 25 to the main output shaft 46. When the voltage in winding 32 of velocity generator 30 attains a predetermined value, the clutch 40 is fully in and no slipping occurs.

The velocity signal generator 50 through its output winding 52 supplies in feedback relation to amplifier 48 a voltage to oppose the voltage in winding 32. Winding 52 thus increases the modulation range of motor 25 and clutch 40. In other words, the motor 25 must attain a higher rotation rate before clutch 40 is fully engaged when feedback winding 52 is utilized than would have been required were clutch 40 energized solely from winding 32 thereby increasing the range over which shaft 46 has a variable rate output.

Where desired as stated, the output voltage from the winding 52 may be also supplied to the servomotor amplifier 20 to increase the stability of the system.

The arrangement of the clutch amplifier 48 and clutch 40 is such that irrespective of the phase of the voltage in signal generator winding 32 the clutch will be energized. With respect to modification of energization of clutch 40, the voltage in winding 52 of signal generator 50 opposes that in winding 32 of velocity signal generator 30.

FIGURE 2 represents the operation of the system with and without the novel clutch arrangement. It is desired to increase the output range of the motor or increase the ratio of full output speed of the drive shaft relative to the smallest attainable drive shaft speed. The curve shows error signal as ordinates plotted against drive shaft speed in r.p.m. In the absence of the clutch 40, the drive shaft or load shaft speed is in accordance with the speed of the motor 25.

Without the clutch, and due to some load on the motor such as friction and the like, a considerable error signal is required from pickoff 14 before the motor suddenly starts rotating at substantially 20 r.p.m. as indicated in FIGURE 2. As the error signal on amplifier 20 increases, the motor and thus the drive shaft 46 (without the clutch) attains its full output speed.

However, with the clutch, slipping in clutch 40 permits the output or drive shaft 46 to attain a lower speed and thereby produce lower rate signal in winding 52 than without the clutch as shown in the graph.

It will be appreciated that the variable clutching arrangement, according to this invention, may be applied by other ways in various servo systems. It will further be noted that the use of such variable clutching means for controlling the output shaft of a servo system makes possible a marked improvement in their dynamic performance of the servo system. A servo system according to this invention accordingly will follow lower input error signals.

While the invention has been particularly described employing alternating current sources and alternating current responsive devices, the concepts of the invention are equally applicable to servo systems employing direct current devices. Further while one embodiment of the invention has been described in detail, this is not to be taken as in any way limiting the invention.

What is claimed is:

1. A motor control system of the follow-up type comprising:
   first means providing a control signal to initiate operation of a motor;
   balanceable second means including a motor operated from said signal for driving a load device;
   a clutch means operable to couple said motor to the load device;
   third means responsive to the speed of the motor operating said clutch to couple the motor and load device; and
   fourth means driven with the load device connected to the second means and nulling said second means.

2. The apparatus of claim 1, wherein the third means is a velocity responsive voltage generator driven by said motor.

3. The apparatus of claim 2; and
   a tachometer driven with said load device supplying a load velocity voltage signal in opposition to the third means voltage to control the clutch means.

4. A motor control system of the follow-up type, comprising: a first signal providing means, control balanceable means including a motor responsive to said first signal to effect operation of said motor essentially without load; clutch means responsive to speed of operation of the motor coupling said motor to a load device and a second signal providing means driven with said load device and connected to said balanceable means thereby supplying a signal thereto opposing the first signal.

5. The apparatus of claim 4, wherein said clutch means comprises a first velocity voltage generator driven by said motor and a clutch responsive to the output voltage of the generator for variably coupling said motor and load device in accordance with the magnitude of the generated voltage.

6. The apparatus of claim 5; and
a second velocity responsive voltage generator driven with the load device and supplying a feedback velocity voltage to the clutch means in opposition to the voltage from the first velocity voltage generator to vary the output torque-motor velocity range of the motor.

7. In a motor control system of the force follow-up pickoff type:
a first pickoff control signal voltage providing means,
a balanceable control means for a motor responsive to said signal;
a motor operated by said control means at a rate in accordance with the magnitude of the signal;
a voltage generator driven by the motor and providing a voltage of a magnitude in accordance with the motor rotation rate;
clutch means energized by the generator operatively connecting the motor to a load device for gradual and smooth acceleration of said load device and nulling said force pickoff.

8. In a motor control system;
a first pickoff motor control signal providing means;
a balanceable control means responsive to said signal operating a motor means;
a first operable means driven by said motor means;
further means including a second operable means connected to the first operable means to be driven at a rate in response to driven rate of the first operable means; and
means driven by the second operable means nulling said pickoff means, whereby the initial operation of the first operable means is effected substantially without external load.

9. The apparatus of claim 8, characterized by said further means comprising a variable torque transmitting clutch for transmitting a torque in accordance with the driven rate of the first operable means for coupling said first operable means to the second operable means.

References Cited in the file of this patent

UNITED STATES PATENTS

| | | |
|---|---|---|
| 1,948,037 | Kingston | Feb. 20, 1934 |
| 2,475,461 | Roberts | July 5, 1949 |
| 2,541,182 | Winther | Feb. 13, 1951 |
| 2,850,654 | Jaeschke | Sept. 2, 1958 |